(12) United States Patent
Atkins et al.

(10) Patent No.: US 12,145,097 B2
(45) Date of Patent: Nov. 19, 2024

(54) SYSTEMS AND METHODS FOR PROCESSING COAL FOR USE IN A DIRECT AIR CAPTURE SYSTEM

(71) Applicant: CARBON HOLDINGS INTELLECTUAL PROPERTIES, LLC, Sheridan, WY (US)

(72) Inventors: Charles Agee Atkins, Sheridan, WY (US); Christopher L. Yurchick, McDonald, PA (US)

(73) Assignee: Carbon Holdings Intellectual Properties, LLC, Ranchester, WY (US)

( * ) Notice: Subject to any disclaimer, the term of this patent is extended or adjusted under 35 U.S.C. 154(b) by 650 days.

(21) Appl. No.: 17/347,349

(22) Filed: Jun. 14, 2021

(65) Prior Publication Data

US 2021/0387130 A1    Dec. 16, 2021

Related U.S. Application Data

(60) Provisional application No. 63/038,554, filed on Jun. 12, 2020.

(51) Int. Cl.
*B01D 53/04* (2006.01)
*B01D 53/32* (2006.01)
(Continued)

(52) U.S. Cl.
CPC .......... *B01D 53/04* (2013.01); *B01D 53/326* (2013.01); *B01D 53/62* (2013.01); *B01D 53/82* (2013.01);
(Continued)

(58) Field of Classification Search
CPC ...... B01D 53/04; B01D 53/326; B01D 53/62; B01D 53/82; B01D 2253/102;
(Continued)

(56) References Cited

U.S. PATENT DOCUMENTS 3,595,946 A   7/1971  Joo et al.
4,533,461 A   8/1985  Izumi et al.
(Continued)

FOREIGN PATENT DOCUMENTS

GB         965622 A      8/1964
WO    2019126782 A1     6/2019

OTHER PUBLICATIONS

Schwartz, Enhanced Electrochemical Carbon Dioxide Separation Using Membrane Electrode Assemblies, (Year: 2021).*

(Continued)

*Primary Examiner* — Randy Boyer
*Assistant Examiner* — Juan C Valencia
(74) *Attorney, Agent, or Firm* — Dorsey & Whitney LLP

(57) ABSTRACT

Embodiments discloses herein relate to methods of processing coal. A method to process coal includes subjecting raw coal to a liquefaction process effective to form a liquid pitch resin and subjecting the liquid pitch resin to a filtration process. The method further includes subjecting the liquid pitch resin to a low crystallinity spinning process to form a raw fiber. The raw fiber is then further subjected to a stabilization process configured to oxygen cross-link the fiber to form a stabilized fiber and then subjecting the stabilized fiber to a carbonization process to form a low thermal conductivity carbon fiber.

15 Claims, 5 Drawing Sheets

(51) Int. Cl.
  *B01D 53/62* (2006.01)
  *B01D 53/82* (2006.01)
  *D01F 9/15* (2006.01)

(52) U.S. Cl.
  CPC .......... *D01F 9/15* (2013.01); *B01D 2253/102* (2013.01); *B01D 2253/20* (2013.01); *B01D 2253/25* (2013.01); *B01D 2257/504* (2013.01); *B01D 2258/06* (2013.01); *B01D 2259/40083* (2013.01); *B01D 2259/80* (2013.01)

(58) Field of Classification Search
  CPC ............ B01D 2253/20; B01D 2253/25; B01D 2257/504; B01D 2258/06; B01D 2259/40083; B01D 2259/80; B01D 53/02; B01D 53/0407; D01F 9/15; Y02P 20/151; B01J 20/0229; B01J 20/20; B01J 20/28023; B01J 20/3078; C01B 32/318; Y02C 20/40
  See application file for complete search history.

(56) References Cited

U.S. PATENT DOCUMENTS

| | | |
|---|---|---|
| 5,037,590 A | 8/1991 | Fukushima |
| 7,070,755 B2 | 7/2006 | Klett et al. |
| 9,181,509 B2 | 11/2015 | Bland et al. |
| 2012/0076703 A1 | 3/2012 | Stiller et al. |
| 2017/0113182 A1* | 4/2017 | Voskian ............... B01D 53/326 |
| 2017/0198221 A1 | 7/2017 | Targett et al. |

OTHER PUBLICATIONS

International Search Report and Written Opinion for PCT Application No. PCT/US2021/037275, dated Oct. 29, 2021.

Jang, et al., "Correlating thermal conductivity of carbon fibers with mechanical and structural properties", Journal of Industrial and Engineering Chemistry, vol. 89, Sep. 25, 2020 (Sep. 25, 2020), , XP086224920, Retrieved from the Internet <URL:https://doi.org/10.1016/j.jiec.2020.06.026> [retrieved on Sep. 13, 2021], pp. 115-118.

EP21822890.6 Partial Supplementary European Search Report dated Jun. 13, 2024 (14 pages).

Hassan et al. Recent Trends in Activated Carbon Fibers Production from Various Precursors and Applications: A Comparative Review. Journal of Analytical and Applied Pyrolysis. vol. 145 (2020) 104715. 22 pages.

* cited by examiner

SYSTEMS AND METHODS FOR PROCESSING COAL FOR USE IN A DIRECT AIR CAPTURE SYSTEM

SUMMARY

Embodiments discloses herein relate to methods for manufacturing low-density carbon fiber from coal. Embodiments herein also relate to manufacturing an electro-swing adsorption (ESA) system. In some embodiments, the ESA system can be included in a direct air capture (DAC) system. The methods disclosed herein may include a continuous process. In an example, the methods disclosed herein can include the direct air capture system including a coal-derived electroactive polymer to capture CO2 from a gaseous stream.

In some embodiments, a method of processing coal can include subjecting raw coal to a liquefaction process to form a liquid pitch resin and subjecting the liquid pitch resin to a filtration process. The filtration process can be to remove mineral matter and heavy metal impurities from the liquid pitch resin. The method can further include subjecting the liquid pitch resin to a low crystallinity spinning process to form a raw fiber. In some embodiments, the method can also include subjecting the raw fiber to a stabilization process configured to oxygen cross-link the fiber to form a stabilized fiber and subjecting the stabilized fiber to a carbonization process to form a low thermal conductivity carbon fiber.

In some embodiments, the pitch resin includes a melting point such that subjecting the liquid pitch resin to a low crystallinity spinning process effective to form raw fiber does not include a plasticizer. In some embodiments, the melting point of the liquid pitch resin is no greater than about 343° C. (650° F.). In some embodiments, the melting point of the liquid pitch resin is between about 80° C. and about 343° C. In some embodiments, the method can further include adding a blend additive to the liquid pitch resin before or during the low crystallinity spinning process. The blend additive can include one or more of isotropic pitch, pitch with a level an anisotropy, or a thermoplastic blend additive.

In some embodiments, the low crystallinity spinning process includes physically altering the spinning conditions. Physically altering the spinning conditions can include having a turbulent flow spinneret design, having low draw ratios on the green spun fiber, having a melt blown solvated spinning system, using flow inverters or fitted flow redistributors in a spinneret capillary channel, introducing voids in the spun fiber, using specialized spinnerets to form hollow fibers with one or more cross-sectional holes, using specialized spinnerets to promote shearing, or a combination thereof. In some embodiments, the pitch resin can be treated with a blowing agent to promote foaming of the raw fiber, wherein the blowing agent includes hydrocarbons including at least one of pentane, cyclopentane, liquid carbon dioxide, chlorofluorocarbons (CFC's), or hydrochloroflorcarbons (HCFC's).

In some embodiments, a method of manufacturing an electro-swing reactive adsorption (ESA) system can include forming a polyanthraquinone-activated carbon composite negative electrode, forming a ferrocene-activated carbon composite anode electrode, and positioning one or more separator membranes between the negative electrode and the anode electrode. In some embodiments, the polyanthraquinone-activated carbon composite negative electrode includes a low-conductivity carbon fiber and the ferrocene-activated carbon composite anode electrode includes the low-conductivity carbon fiber.

In some embodiments, the method of manufacturing an electro-swing reactive adsorption (ESA) system can further include forming the low-conductivity carbon fiber by subjecting raw coal to a liquefaction process to form a liquid pitch resin, subjecting the liquid pitch resin to a filtration process, subjecting the liquid pitch resin to a low crystallinity spinning process to form a raw fiber, subjecting the raw fiber to a stabilization process configured to oxygen cross-link the fibers, and subjecting the stabilized fiber to a carbonization process to form a low-conductivity carbon fiber. In some embodiments, the method further includes forming the activated carbon by providing an amount of coal, beneficiating the amount of coal to remove impurities therefrom, processing at least some of the beneficiated amount of coal effective to produce an amount of solid char, and treating at least some of the solid char effective to produce an amount of the activated carbon. In some embodiments, the solid char can include a hydrogen to carbon ratio of from about 0.05 to about 0.65.

In some embodiments, treating at least some of the solid char can include at least one of a physical activation or a chemical activation. In some embodiments, the physical activation includes heating the char in an inert atmosphere. In some embodiments, the physical activation includes heating the char in an oxidizing atmosphere. The chemical activation can include impregnating the char with one or more chemicals.

An electro-swing reactive adsorption (ESA) system can include a polyanthraquinone-activated carbon composite negative electrode, a ferrocene-activated carbon composite anode electrode, and one or more separator membranes positioned between the negative electrode and the anode electrode. In some embodiments, the polyanthraquinone-activated carbon composite negative electrode can include a low-conductivity carbon fiber and the ferrocene-activated carbon composite anode electrode can include the low-conductivity carbon fiber. The low-conductivity carbon fiber can be a coal-based low conductivity carbon fiber. In some embodiments, the activated carbon is a coal-based activated carbon.

In some embodiments, the ESA system can be included in a direct air capture (DAC) system.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
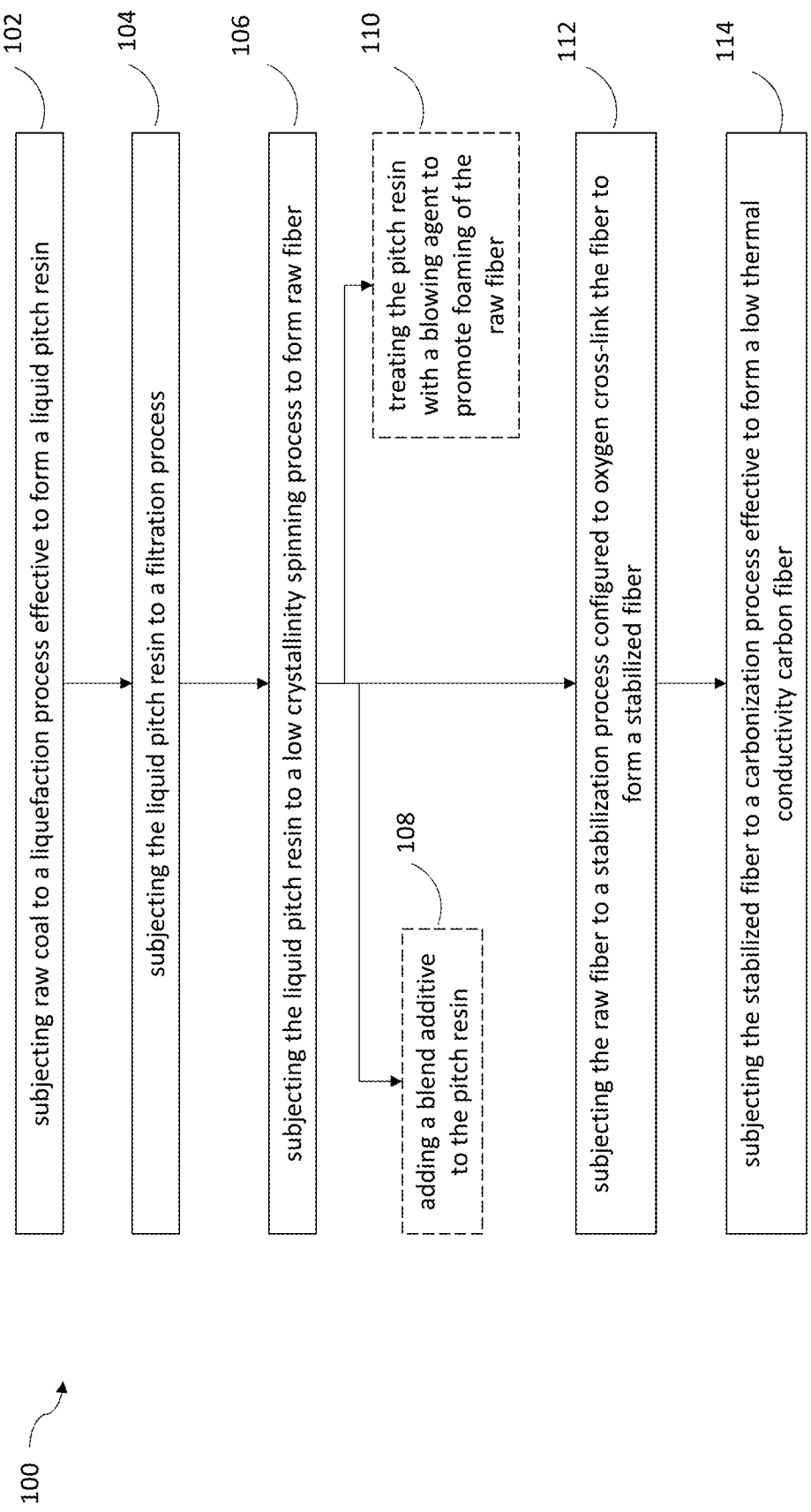
FIG. 1 is a flow chart of a method of processing coal, according to an embodiment.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, methods described can be performed in an order different from that described, and various steps can be added, omitted, or combined. Also, features described with respect to some embodiments can be combined in other embodiments.

Systems and methods for processing coal to form advanced carbon products for use in a direct air capture (DAC) system are provided. The advanced carbon products can include one or more of carbon fibers, activated carbon, coal-derived char, resins, graphene, materials for use in batteries, materials for use in building and construction, or combinations thereof. The systems and methods provided herein can include processing of pitches made from coal, as well as products formed or manufactured by the systems and methods. Systems and methods described herein promote the production of low-cost low thermal conductivity carbon fiber products. For example, many carbon fiber products produced according to this disclosure have lower density than conventional carbon fiber products produced from similar materials. The low-density carbon fiber product retains heat, thus providing the carbon fiber product with properties to lower the thermal conductivity relative to traditional carbon fibers.

The low-thermal conductivity carbon fiber products produced according to many of the systems and methods described herein are unexpected to those skilled in the technology. Many embodiments of the systems and methods described herein enhance the conversion of coal-based pitch intermediate products into useful conversion products, such as high-carbon containing pitch fiber products with low-thermal conductivities. These products can be suitable as thermal insulation materials and/or low-density carbon fibers. In particular, the present techniques utilize specially designed systems and one or more blend additives for tuning physical properties of the carbon fibers, such as at least one of the density (specific gravity) and/or the thermal conductivity of the carbonized fiber. Many systems and methods described herein can use a low-cost and high-yielding coal-based pitch precursor that is advantageous from conventional high-cost and low-yielding PAN-based or cellulosic-based insulative fiber. The systems and methods described herein also can provide carbon fiber products in a manner that allows low cost pitch-based carbon fiber to fulfill all useful applications in a way that significantly reduces costs versus incumbents. For example, the systems and methods can produce affordable carbon fiber insulation for improving energy efficiency in the built environment as an alternative to fiberglass insulation.

FIG. 1 is a flow diagram of a method 100 for processing coal effective to form a low thermal conductivity carbon fiber, according to an embodiment. For example, the method 100 may include an act 102 of subjecting a raw coal to a liquefaction process effective to form a liquid pitch resin. Coal liquefaction is a process in which coal is converted into liquid. There are several processes used to accomplish this task, the two most common being the indirect route and the direct route. In some embodiments, the indirect route is composed of 2 steps: First, the coal can be gasified with steam and oxygen to produce a synthesis gas (syngas), which is then cleaned to rid of dust, tar, and acid gases. The second step reacts the synthesis gas with a catalyst in the Fischer-Tropsch process, which converts the syngas into a range of hydrocarbons. For example, the hydrocarbon may include a pitch resin. In the direct route, coal is pulverized and reacted with a catalyst, and then hydrogen is added under high pressures and temperatures in the presence of a solvent to produce hydrocarbons such as liquid pitch resin. In another embodiment, the pulverized coal can be suspended in a hydrogen donating solvent and reacted under pressure in an inert atmosphere with or without the presence of a catalyst.

The method 100 may also include an act 104 of subjecting the liquid pitch resin to a filtration process. In some embodiments, the filtration process includes a mechanical filtration. In some embodiments, the filtration process includes a chemical filtration. Act 104 may filter the liquid pitch resin to remove mineral matter and heavy metals included in the pre-filtered raw coal. In some embodiments, the filtration process may be conducted at elevated temperatures. The elevated temperatures can include temperatures between about 60° C. and about 300° C. In some embodiments, act 104 may include heating the liquid resin pitch temperature to about 60° C. or greater, about 100° C. or greater, about 150° C. or greater, about 200° C. or greater, about 300° C. or greater, or in ranges of about 60° C. to about 100° C., about 100° C. to about 200° C., or about 200° C. to about 300° C. The final temperature may be about 200° C. or greater, about 250° C. or greater, or about 300° C. or greater.

In some embodiments, the melting point of the pitch resin may be no greater than about 343° C. In some embodiments, the melting point of the liquid pitch resin is between about 80° C. and about 343° C. In some embodiments, the pitch resin includes a melting point such that subjecting the pitch resin to a low crystallinity spinning process effective to form raw fiber does not include a plasticizer. In some embodiments, including prior art, a plasticizer may include a substance that is added to a material to make it softer and more flexible, to increase its plasticity, to decrease its viscosity, or to decrease friction during its handling in manufacture.

In an embodiment, the liquid and filtered pitch resin may then be subjected to a low crystallinity spinning process effective to form a raw fiber in act 106. In many embodiments, the systems and methods include at least one of two processes for disrupting the highly-densified crystalline graphitic structure associated with carbon fibers. The two processes for disrupting the highly-densified crystalline graphitic structure can include physically altering spinning conditions in a variable-crystallinity spinning process and chemically altering pitch composition with one or more blend additives. Spinning conditions can be physically altered in a low crystallinity spinning process to be more conducive to disrupting liquid crystalline formation. In some embodiments, the spinning conditions can be physically altered by one or more of a turbulent flow spinneret design, low draw ratios on the green spun fiber, a melt blown solvated spinning system versus neat resin melt spinning, use of flow inverters or fritted flow redistributors in spinneret capillary channel, introduction of voids (such as nano-sized bubbles) in the spun fiber via foaming, and/or use of specialized spinnerets for formation of hollow fibers with one or more cross-sectional holes, or combinations thereof.

In some embodiments, the method 100 may also include an act 108 of adding a blend additive to the pitch resin before or during the low crystallinity spinning process of act 106. In some embodiments, the blend additive can include one or more of an isotropic pitch, a pitch with a level of anisotropy, or a thermoplastic blend additive. Pitch is generally isotropic, but can be made anisotropic through heat treatments. Isotropic pitch and anisotropic pitch are different not only in carbonaceous precursors but also in their optical texture, microstructure, and physical properties. The additive can improve the strength and rigidity of the raw fiber. The pitch composition also can be chemically altered with one or more blend additives to be more conducive to disrupting liquid crystalline formation. The result of including one or more blend additives can be a carbon fiber that has a lower density than conventionally formed carbon fibers. The resulting carbon fiber, then, can include properties more similar or even superior to the properties of Rayon carbon fiber, such as a lower thermal conductivity. In some embodiments, the pitch composition can be altered by utilizing isotropic pitch and/or an anisotropic pitch with a degree of anisotropy between 0% and 80% as a blend additive (or neat) instead of high discotic liquid-crystalline containing mesophase pitches. In some embodiments, the blend additive can include one or more of an anisotropic pitch of varying degrees.

In some embodiments, the pitch composition can be altered by utilizing oxygen-containing additives such as an oxygen containing polymeric material. In some embodiments, the pitch composition can be altered by utilizing one or more compounds containing hetero-atoms such as oxygen or nitrogen. In some embodiments, the pitch composition can be altered by utilizing one or more thermoplastic blend additives (phenolic resins, lignin, etc.) containing hetero-atoms such as oxygen or nitrogen. Blending materials including hetero-atoms (such as oxygen) with the pitch while spinning fibers can lower the density of the fibers. Examples of the one or more thermoplastic blend additives containing hetero-atoms such as nitrogen or oxygen can include (but is not limited to) polyphenolic formaldehyde resin, lignin, polyethylene oxide, poly vinyl alcohol, poly-DL-lactide, polymethylmethacrylate, or combinations thereof. In some embodiments, one or more of the heteroatom containing additives can be derived from coal.

The physical and chemical processes for disrupting the highly-densified crystalline graphitic structure associated with carbon graphite fibers described above can alter the pitch-based carbon fibers to approach microstructure properties and resulting densities and insulative properties that are more commonly associated with cellulosic-based (Rayon) carbon fibers. Tables 1 and 2 provide a comparison of properties of PAN-based, PITCH-based, and Rayon-based carbon fibers.

TABLE 1

Carbon Fiber Mechanical Properties

| Carbon Fiber Mechanical Properties | PAN BASED | PITCH BASED | RAYON BASED |
|---|---|---|---|
| Tensile Modulus (Mpsi) | 33-56 | 23-55 | 5.9 |
| Tensile Strength (Msi) | 0.48-0.35 | 0.2-0.25 | 0.15 |
| Elongation (%) | 1.4-0.6 | 0.9-0.4 | 25 |
| Density (g/cc) | 1.8-1.9 | 1.9-2.0 | 1.6 |
| Carbon Assay (%) | 92-100 | 97-99 | 99 |

TABLE 2

Rayon Carbon Fiber Properties

| Parameter | Characterization |
|---|---|
| Tensile strength | ~100 ksi; 685 MPa |
| Tensile modulus | ~6 Msi; 41 GPa |
| Thermal conductivity | 3.7 W/m-K |
| Ash content | 0.4 w % |
| Carbon Assay, w % | 96+ |

The method 100 may also include an act 110. Act 110 can include treating the pitch resin with a blowing agent to promote foaming of the raw carbon fibers. In some embodiments, the blowing agent can include at least one hydrocarbon. The blowing agent can include at least one of pentane, cyclopentane, liquid carbon dioxide, chlorofluorocarbons (CFC's), and hydrochloroflorcarbons (HCFC's). However, there are several other materials that can be the blowing agent. The blowing agent can produce a cellular structure via a foaming process in some embodiments. The cellular structure in a matrix reduces density, increasing thermal and acoustic insulation, while increasing relative stiffness of the pitch resin and the carbon fiber.

In some embodiments, the method 100 may also include an act 112. Act 112 includes subjecting the raw fiber to a stabilization process configured to oxygen cross-link the fiber to form a stabilized fiber. In some embodiments, the raw fiber can undergo a stabilization process where air (oxygen), and in some cases additional gases or vapors, are introduced to alter the linear atomic bonding of the fibers to a more thermally stable form. Raw carbon fibers must be stabilized prior to a calcination step of the overall process discussed below in act 114. The stabilization prevents the molecules within the carbon fiber from exhibiting relaxation and becoming unaligned during the calcination step. The stabilization maintains the integrity of the molecules and allows the fibers to remain in their solid form throughout the final processing steps.

In some embodiments, the stabilization of the fibers can be performed at a temperature of 200-300° C. and include a resonance time of 30-120 minutes. During this resonance time, the fiber can be exposed to an atmosphere of air, which contains roughly 21% oxygen. Additional gases or vapors can be added the stabilization atmosphere to alter the reactions occurring within the pitch of the fibers. During act 112 including the stabilization, the fibers can be maintain under tension to prevent the relaxation and misalignment of the molecules with the pitch. Pitch-based carbon fibers may typically form esters and anhydride compounds within the pitch during act 112. The pitch-based fibers can also experience the loss of aromatic content during act 112.

The method 100 may also include an act 114. In act 114, the stabilized fiber can be subjected to a carbonization process effective to form a low thermal conductivity carbon fiber. In some embodiments, carbonization is a process by which the stabilized fiber is heated and any volatile products (liquid and gaseous) can be driven off, leaving a solid low thermal conductivity carbon fiber.

While systems and methods for manufacturing low thermal conductivity carbon fiber insulation have been described above, other systems and methods for manufacturing, producing, or otherwise forming various advanced carbon materials are contemplated in this disclosure. These various advanced carbon materials can include other carbon fibers, activated carbon, resins, graphene, materials for use in batteries, materials for use in building and construction, or combinations thereof. Methods for producing carbon fibers, resins, graphene, and other advanced carbon materials (including activated carbon) from coal are disclosed in PCT Patent International Application No. PCT/US2018/067341 filed Dec. 21, 2018, the disclosure of which is incorporated herein, in its entirety, by this reference.

Figure 2:
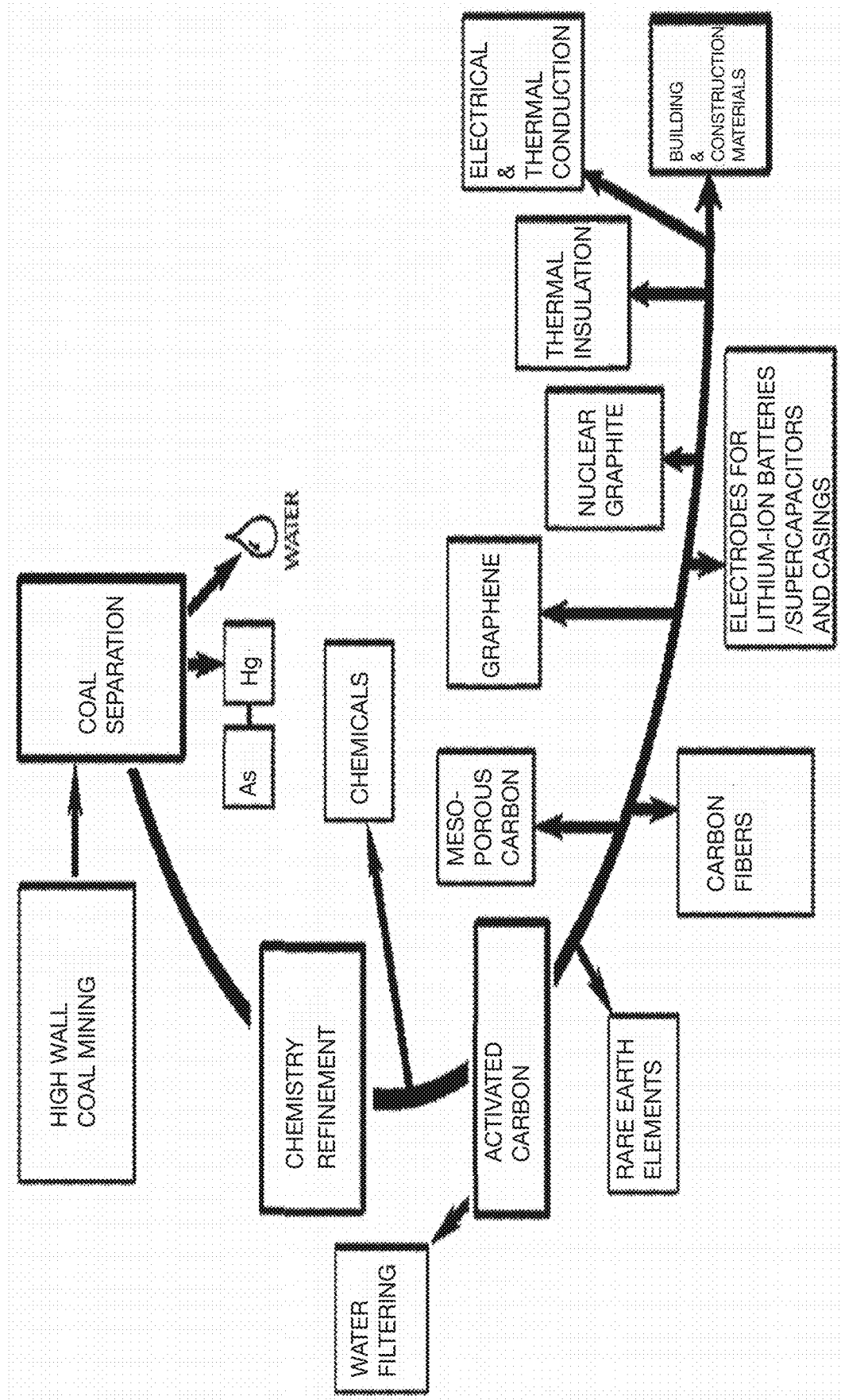
FIG. 2 illustrates the process flow of raw coal, according to an embodiment.

FIG. 2 is a diagram illustrating the process flow of raw coal, for example, from a high wall coal mine, according to the embodiments described herein, to form various advanced carbon materials, such as activated carbon, graphene, materials for use in batteries, and building and construction materials, according to an embodiment. As illustrated, and according to some embodiments, processing of the coal can produce advanced carbon materials which can themselves be subjected to further processing to form other advanced carbon materials. Further, in some embodiments, the byproducts from the production of advanced carbon materials can themselves be subjected to further processing to produce other advanced carbon materials as described herein.

More specifically, raw coal can be provided to a processing facility, with the processing facility can have the capacity to store raw coal for use as needed, or can receive raw coal as needed to produce a desired amount of advanced carbon material, such as activated carbon. The raw coal can be beneficiated to remove contaminants or impurities such as water, heavy metals, and/or volatile compounds from the raw coal, thereby producing beneficiated or upgraded coal.

The beneficiated coal can comprise a significantly reduced amount of mercury, cadmium, other heavy metals, water, and/or other impurities. As used herein, an impurity can be considered any element or compound other than carbon or hydrogen. For example, beneficiating the coal can reduce the amount of mercury in the coal by about at least about 70%, 75%, 80%, 85%, 90%, or 92% or more. In some cases, beneficiating the coal can reduce the water or moisture content of the coal to less than about 5 wt. %, 4 wt. %, 3 wt. %, 2 wt. %, or 1.5 wt. % or lower. In some cases, beneficiating the coal can remove one or more of hydrogen, sulfur, oxygen, arsenic, selenium, cadmium, or volatile matter from the coal. The amount of one or more of these elements in the coal can be reduced by from about 25% to about 90%.

In some embodiments, beneficiating the coal can produce various other products that can be captured and used in later processing steps, that can be valuable in and of themselves, or that can be subjected to further processing. For example, in some embodiments, beneficiating the coal can also produce a solid material known as ash or char. In some cases, this char can be subjected to further processing to form activated carbon, described in greater detail below.

The beneficiated coal, also referred to as upgraded coal, can be processed via the processing facility. In some embodiments, processing the beneficiated coal can include subjecting the upgraded coal to a liquid extraction process, such as a pyrolysis process, a direct liquefaction process, an indirect liquefaction process, or a process including one or more membranes. In some embodiments, one or more additives can be added to the beneficiated coal. In some embodiments, one or more other gases or liquids can be used during the processes. For example, hydrogen containing gases can be added to or used during a coal liquefaction process. In some cases, natural gases, CO2, or petroleum products can be used as additives. In some embodiments, the one or more additives can include materials or compounds that are produced during earlier processing, or that can be produced by or captured during previous iterations of the process.

Pitch, char, gases, and/or coal liquid can be produced via the processing facility. In some embodiments, pitch can be produced via the processing facility. As used herein, pitch, also known as coal pitch, coal tar, or coal tar pitch, can refer to a mixture of one or more typically viscoelastic polymers as will be well understood by the skilled artisan. In some embodiments, the pitch produced can be a direct result of processing the beneficiated coal. The pitch produced can comprise one or more high molecular weight polymers. In some embodiments, the pitch can have a melting point of no greater than about 650° F. In some embodiments, the pitch can have a melting point that is high enough that the pitch can be used in a carbon fiber spinning process, for example as described herein, without the need for a plasticizer. In some embodiments, the melting point of the liquid pitch resin is between about 80° C. and about 343° C.

In some embodiments, char can be produced via the processing facility. As used herein, char can refer to any solid material which remains after gases, liquids, and/or pitch have been removed from raw coal. In some embodiments, at least some of the char produced can be processed effective to produce the advanced carbon material of activated carbon. For example, at least some of the char and be carbonized or heated (in, for example, a rotary kiln).

In some embodiments, activated carbon also can be produced from coal by utilizing an isotropic pitch that is processed to form a foam. This foam can be activated to produce a high surface area activated carbon. Additional systems and methods of producing an activated carbon are disclosed in U.S. Pat. No. 7,070,755, filed Jan. 29, 2002, the disclosure of which is incorporated herein, in its entirety, by this reference.

Figure 3:
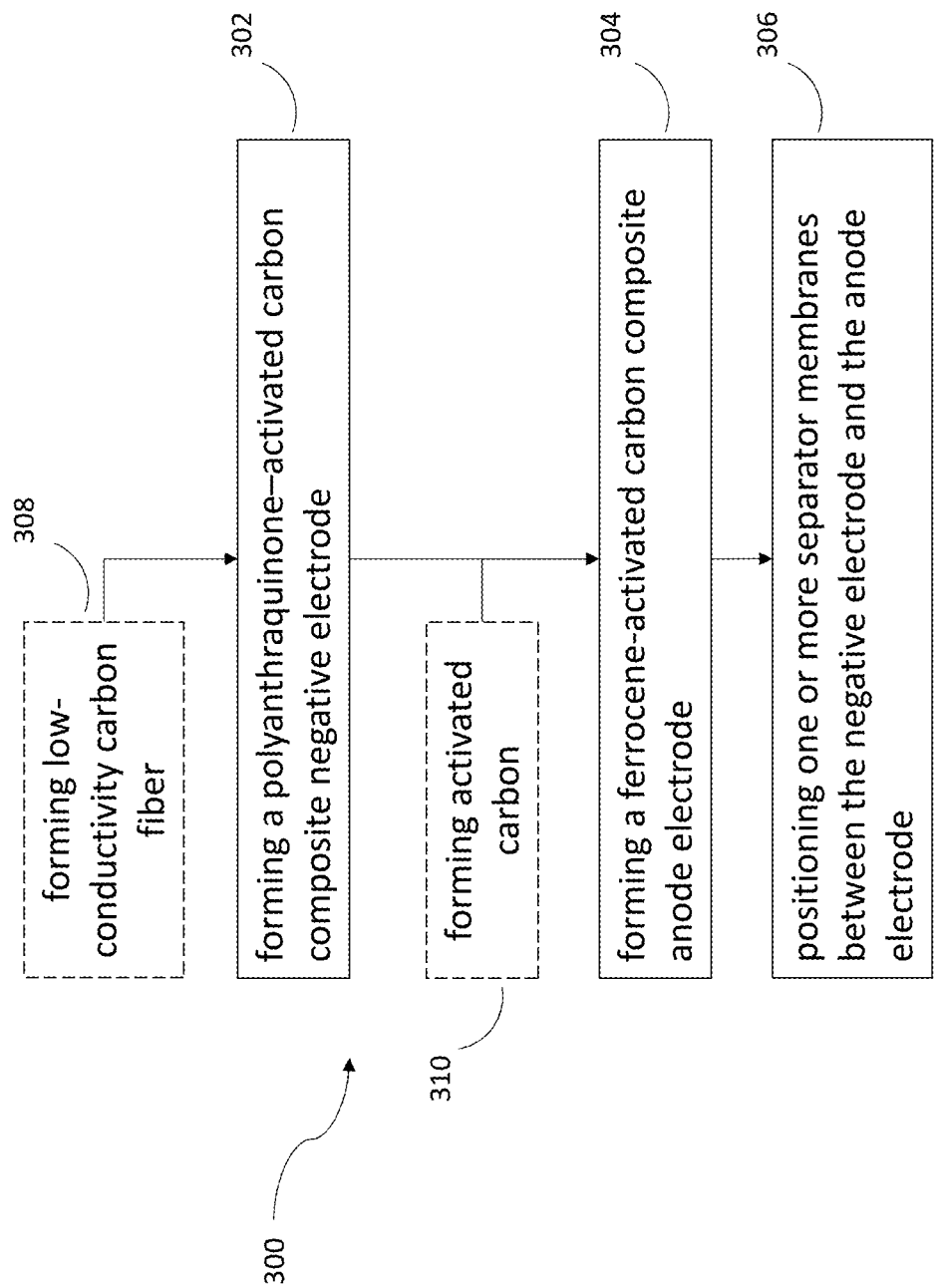
FIG. 3 is a flow chart of a method to manufacture an electro-swing reactive adsorption (ESA) system, according to an embodiment.

FIG. 3 is a flow chart of a method 300 to manufacture an electro-swing reactive adsorption (ESA) system, according to an embodiment. In some embodiments, the method 300 includes forming a polyanthraquinone-activated carbon composite negative electrode as shown in block 302. In some embodiments, the method 300 includes forming a ferrocene-activated carbon composite anode electrode as shown in block 304. The method 300 further includes positioning one or more separator membranes between the negative electrode and the anode electrode, as shown in block 306. In some embodiments, the polyanthraquinone-activated carbon composite negative electrode includes a low-conductivity carbon fiber and the ferrocene-activated carbon composite anode electrode also includes the low-conductivity carbon fiber. In some embodiments, the low-conductivity carbon fiber can be formed as shown in block 308 and is formed by the process generally described in reference to FIG. 1. Forming the low-conductivity carbon fiber can include subjecting raw coal to a liquefaction process to form a liquid pitch resin, subjecting the liquid pitch resin to a filtration process, subjecting the liquid pitch resin to a low crystallinity spinning process to form raw fiber, subjecting the raw fiber to a stabilization process configured to oxygen cross-link the fibers, and subjecting the stabilized fiber to a carbonization process to form a low-conductivity carbon fiber.

The method 300 can also include forming the activated carbon as shown in block 310. In some embodiments, the activated carbon can be formed by providing an amount of coal, beneficiating the amount of coal to remove impurities therefrom, processing at least some of the beneficiated amount of coal effective to produce an amount of solid char, and treating at least some of the solid char effective to produce an amount of the activated carbon.

In some embodiments, the beneficiation process can comprise heating the raw coal to a desired temperature for a first duration. In some embodiments, beneficiation can also include heating the raw coal to a second, higher desired temperature of a second duration. In some embodiments, the coal can be heated in an atmosphere comprising a halogen gas. In some embodiments, beneficiation can include subjecting the raw coal to a WRITECoal beneficiation process, as described, for example, in U.S. Pat. No. 9,181,509 which is hereby incorporate by reference in its entirety. In some other embodiments, the coal can be beneficiated by heating the coal to a desired temperature in the presence of one or more catalyst compounds. In some cases, beneficiating the coal can comprise pyrolyzing the coal, for example in the presence of a catalyst. In some cases, the coal can be beneficiated by the BenePlus System, as developed and licensed by LP Amina and as described, for example, in U.S. Patent Publication No. 2017/0198221 which is hereby incorporated by reference in its entirety.

In some embodiments, char can be produced during the beneficiation of raw coal, by earlier acts of the process described above, or any combinations thereof. In some embodiments, char can comprise a solid high surface area carbonaceous material. In some cases, char can have a relatively low H:C ratio, for example lower than the H:C ratio of pitch produced during processing of the coal. In some cases, char can have an H:C ratio of from about 0.05 to about 0.65. In some embodiments, the H:C ratio may include about 0.05 or greater, about 0.15 or greater, about 0.25 or greater, about 0.4 or greater, about 0.55 or greater, or in ranges of about 0.05 to about 0.2, about 0.20 to about 0.40, or about 0.40 to about 0.65.

In some cases, char can additionally comprise at least some pitch material, which can be referred to herein as intrinsic binder impregnation. In some cases, any residual pitch or other gaseous or liquid materials can be removed from the char prior to any subsequent processing of the char.

The char can then be activated, for example, via a physical activation process or a chemical activation process. In some embodiments, physical activation can comprise heating the char in an atmosphere comprising argon and/or nitrogen, or heating the char in an oxidizing atmosphere. In some embodiments, chemical activation can comprise impregnating the char with one or more chemicals, such as an acid, a base, or a salt. In some embodiments, chemical activation can further comprise carbonizing or heating the impregnated char to activate it. In some embodiments, chemical activation can require lower temperatures and less energy than physical activation. Further, in some embodiments, other chemical byproducts produced by other process for producing advanced carbon(s) can be utilized during the chemical activation process.

Figure 4:
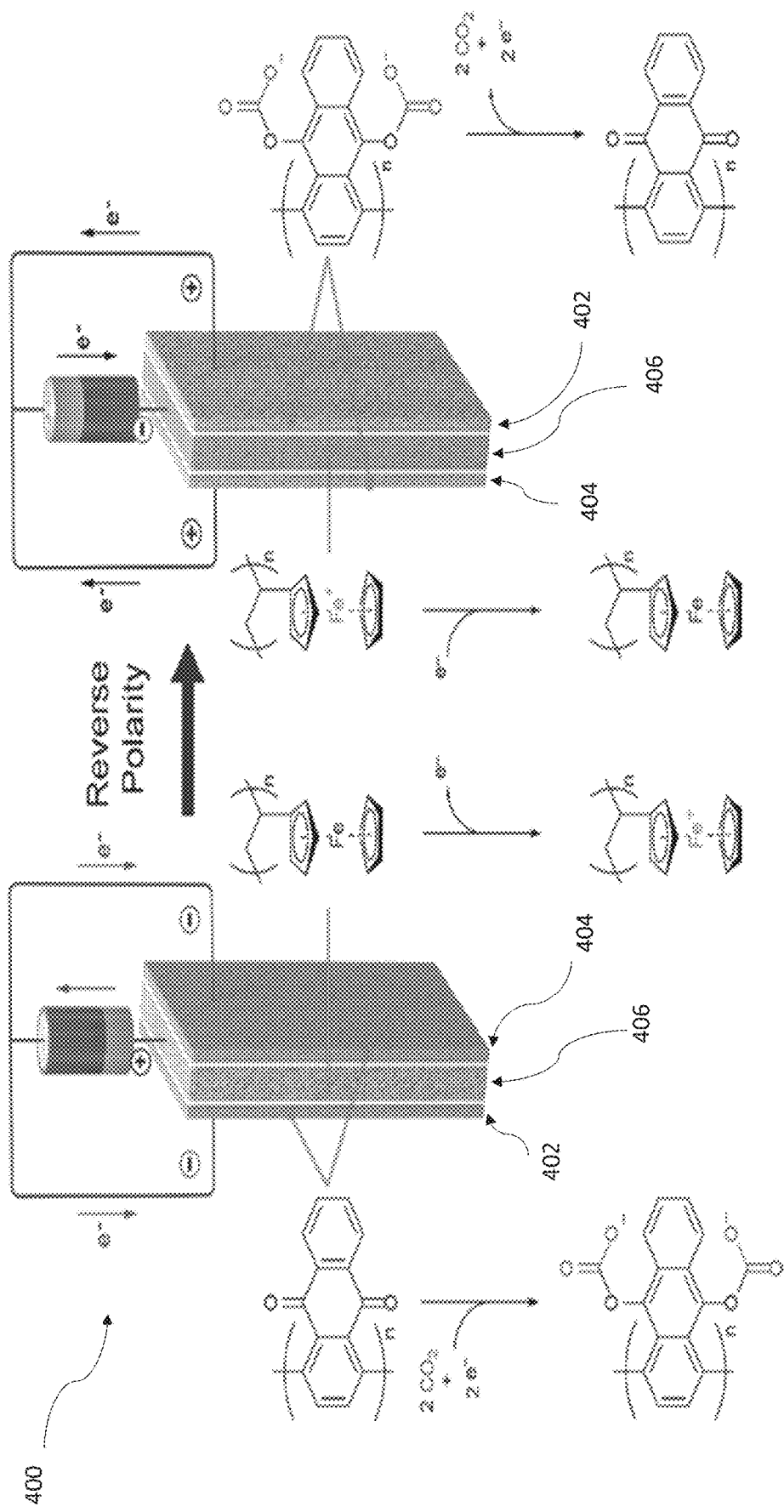
FIG. 4 is a schematic illustration of an electro-swing reactive adsorption (ESA) system that may be formed by the method illustrated in FIG. 3, according to an embodiment.

Referring now to FIG. 4, an electro-swing reactive adsorption (ESA) system 400 is disclosed, according to an embodiment. The ESA system 400 can include a sealed chamber and a flow cell. $CO_2$ capture and release on electrochemical activation and deactivation of the quinones, respectively, can be indicated by the concomitant pressure changes in the chamber. The flow cell can house stacks of the electrochemical cells to allow for capture of $CO_2$.

In some embodiments, the electro-swing reactive adsorption (ESA) system 400 includes a polyanthraquinone-activated carbon composite negative electrode 402, a ferrocene-activated carbon composite anode electrode 404, and one or more separator membranes 406 positioned between the negative electrode 402 and the anode electrode 404. The electrochemical cell can include a polyanthraquinone-activated carbon composite negative electrode captures $CO_2$ upon charging via the carboxylation of reduced quinones, and releases $CO_2$ upon discharge. An electrochemical cell including quinone-activated carbon composite can operate as an ESA process.

The activated carbon in the polyanthraquinone-activated carbon composite negative electrode 402 may include carbon activated according to one or more of the coal processing systems and methods described herein. The cell can include two cathode electrode substrates coated with a $CO_2$-binding quinone-activated carbon composite sandwiching an anode electrode substrate. The anode electrode 404 substrate can be coated with a ferrocene-activated carbon composite, such as an activated carbon composite including activated carbon formed from coal as described herein, and separator membranes 406 can be positioned between the electrodes. In other words, the polyanthraquinone-activated carbon composite negative electrode 402 includes a low-conductivity carbon fiber and the ferrocene-activated carbon composite anode electrode 404 includes the low-conductivity carbon fiber. In some embodiments, the low-conductivity carbon fiber is a coal-based low conductivity carbon fiber. In some embodiments, the activated carbon is a coal-based activated carbon.

The cell architecture can help maximize the surface area exposed to gas, allowing for ease of stacking of the cells in a parallel passage contactor bed. The ferrocene-activated carbon composite electrode 404 can serve as an electron source and sink for the reduction and oxidation, respectively, of the quinone-activated carbon composite electrodes 402 to regulate the uptake and release of the $CO_2$.

In other embodiments, the ESA system 400 does not include a ferrocene-activated carbon composite electrode 404. Wetting of porous non-woven carbon fiber mats used as the electrode substrates by a room temperature ionic liquid (RTIL) electrolyte enables effective ionic currents to pass through the electrolyte on activation and deactivation of the electrodes, and permits the diffusion of $CO_2$ into the electrolyte-wetted cathodes during capture.

Figure 5:
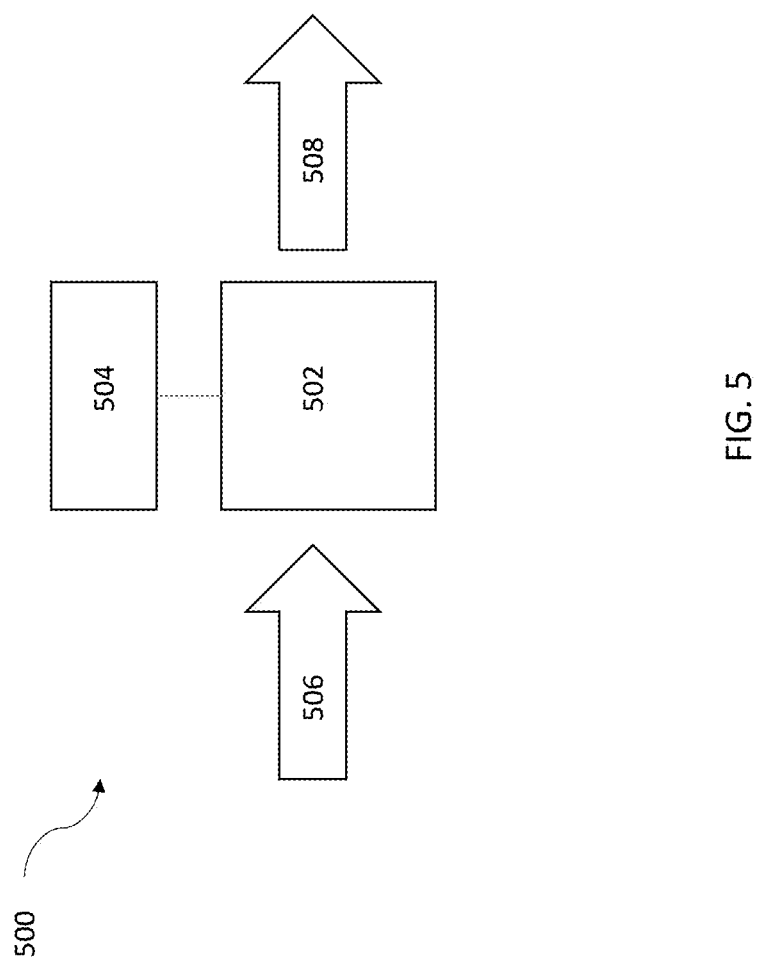
FIG. 5 is a schematic illustration of a direct air capture system, according to an embodiment.

In some embodiments, the ESA system 400 can be includes in a direct air capture (DAC) system 500. FIG. 5 is a schematic illustration of a DAC system, according to an embodiment. The advanced carbons, including the low-density carbon fibers and/or the activated carbons, formed according to one or more of the methods and systems described herein may be utilized in a DAC system 500, such as a thermoelectric DAC, a DAC using coal-derived electroactive polymers (EAPs), or any combinations thereof. Accordingly, also disclosed herein is a DAC system 500 having at least one of a low-density carbon fiber, an activated carbon, or another advanced carbon according to any of the systems and methods described above. In some embodiments, a DAC system 500 using coal-derived EAPs may not include low-density carbon fibers and may additionally or alternatively include other coal derived materials, such as coal-derived graphene or graphene oxide.

The coal-derived EAPs may be formed from anthracene. In some embodiments, coal can undergo liquefaction effective to produce anthracene and/or other polycyclic aromatic hydrocarbons (PAH). The coal-derived anthracene may then be oxidized effective to form anthraquinone or a similar product. The anthraquinone may then be chlorinated using, for example, hydrochloric acid effective to form dichloroanthraquinone. The dichloroanthraquinone can then be polymerized effective to form an EAP.

The coal-derived EAP can retain ketone functionality, which promotes CO2 binding to the EAP when a voltage is applied thereto. Once the EAP binding sites are saturated with bound or adsorbed CO2, the polarity of the voltage can be reversed, resulting in bound CO2 debinding or being emitted from the EAP high quantities. As the polarity can be reversed in a battery or other system comprising the EAPs, separate materials are not needed for the anode and the cathode in the system. These properties allow use of feed gases having relatively low concentrations of CO2 (415 ppm in air, for example), with the ability to pass the increase the amount of bound CO2 with multiple passes of the feed gas over the EAP. In some embodiments, carbon nanotubes, graphene, graphene oxide, and/or other coal-derived conductive carbon materials also may be added to the system to increase conductivity of the components including the EAPs.

FIG. 5 shows DAC system 500 having a low-density carbon fiber. In some embodiments, the DAC system 500 includes an electro-swing reactive adsorption (ESA) system 502 comprising an electrochemical cell that exploits the reductive addition of CO2 to quinones for carbon capture. In some embodiments, the system can rely on an electric field effect to promote the adsorption or capture of CO2 and its subsequent release as desired. The ESA system 502 can eliminate the requirement for complex flow systems, and can be effective in the treatment of both high and low concentration feed stream. The DAC system 500 includes a voltage source 504. In an example, the voltage source 504 can include a generator, battery, or cell. In some embodiments the voltage source 504 can include a direct voltage source or an alternating voltage source. The voltage source 504 can include a voltage controlled voltage source or a current controlled voltage source to apply an electric field. The DAC system 500 is configured to bind carbon dioxide from a gaseous stream 506. The carbon dioxide binds to the ESA system 502 when an electric field is applied. The polarity of the voltage can be reversed and the bound carbon dioxide can be emitted from the ESA 302 and/or the DAC system 500. The DAC system 500 is configured to produce a gas stream 508 having a lower concentration of CO2 than the gaseous stream 506. In some embodiments, the gas stream 508 includes no CO2.

The thermoelectric DAC, the DAC using coal-derived electroactive polymers EAPs, and the electro-swing reactive absorption may be used in a variety of settings. For example, thermoelectric DAC, the DAC using coal-derived electroactive polymers EAPs, and the electro-swing reactive absorption can be used to counter the negative effects of CO2 during a new building or structure construction. Panel-like structures including the thermoelectric DAC, the DAC using coal-derived electroactive polymers EAPs, and the electro-swing reactive absorption can be added to the buildings to capture CO2 during and after construction of the buildings. The buildings, then, may harvest CO2 in the thermoelectric DAC, the DAC using coal-derived electroactive polymers EAPs, and the electro-swing reactive absorption. The CO2 captured in the thermoelectric DAC, the DAC using coal-derived electroactive polymers EAPs, and the electro-swing reactive absorption built into the building may be utilized in numerous materials, such as conversion into hydrocarbon material(s) or a reverse water gas shift that converts the CO2 into syngas and densified liquid(s).

As used herein, the term "about" or "substantially" refers to an allowable variance of the term modified by "about" or "substantially" by ±10% or ±5%. Further, the terms "less than," "or less," "greater than," "more than," or "or more" include, as an endpoint, the value that is modified by the terms "less than," "or less," "greater than," "more than," or "or more."

While various aspects and embodiments have been disclosed herein, other aspects and embodiments are contemplated. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Features from any of the disclosed embodiments may be used in combination with one another, without limitation. In addition, other features and advantages of the present disclosure will become apparent to those of ordinary skill in the art through consideration of the following detailed description and the accompanying drawings. Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including" and "having" come as used in the specification and claims shall have the same meaning as the term "comprising."

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A method of manufacturing an electro-swing reactive adsorption (ESA) system, the method comprising:
    forming a polyanthraquinone-activated carbon composite negative electrode;
    forming a ferrocene-activated carbon composite anode electrode; and
    positioning one or more separator membranes between the negative electrode and the anode electrode.

2. The method of claim 1, wherein the polyanthraquinone-activated carbon composite negative electrode includes a low thermal conductivity carbon fiber and the ferrocene-activated carbon composite anode electrode includes the low thermal conductivity carbon fiber.

3. The method of claim 1, further comprising forming the low thermal conductivity carbon fiber by:
    subjecting raw coal to a liquefaction process to form a liquid pitch resin;

subjecting the liquid pitch resin to a filtration process;
subjecting the liquid pitch resin to a low crystallinity spinning process to form raw fiber;
subjecting the raw fiber to a stabilization process configured to oxygen cross-link the fibers; and
subjecting the stabilized fiber to a carbonization process to form the low thermal conductivity carbon fiber.

4. The method of claim 1, further comprising forming the activated carbon by:
providing an amount of coal;
beneficiating the amount of coal to remove impurities therefrom;
processing at least some of the beneficiated amount of coal effective to produce an amount of solid char; and
treating at least some of the solid char effective to produce an amount of the activated carbon.

5. The method of claim 4, wherein the solid char includes a hydrogen to carbon ratio of from about 0.05 to about 0.65.

6. The method of claim 4, wherein treating at least some of the solid char includes at least one of a physical activation or a chemical activation.

7. The method of claim 6, wherein the physical activation includes heating the char in an inert atmosphere.

8. The method of claim 6, wherein the physical activation includes heating the char in an oxidizing atmosphere.

9. The method of claim 6, wherein chemical activation includes impregnating the char with one or more chemicals.

10. An electro-swing reactive adsorption (ESA) system, the system comprising:
a polyanthraquinone-activated carbon composite negative electrode;
a ferrocene-activated carbon composite anode electrode; and
one or more separator membranes positioned between the negative electrode and the anode electrode.

11. The system of claim 10, wherein the polyanthraquinone-activated carbon composite negative electrode includes a low thermal conductivity carbon fiber and the ferrocene-activated carbon composite anode electrode includes the low-conductivity carbon fiber.

12. The system of claim 11, wherein the low thermal conductivity carbon fiber is a coal-based low conductivity carbon fiber.

13. The system of claim 10, wherein the activated carbon is a coal-based activated carbon.

14. The system of claim 10, wherein the ESA system is included in a direct air capture (DAC) system.

15. The system of claim 11, wherein the low thermal conductivity carbon fiber is formed by:
subjecting a liquid pitch resin to a low crystallinity spinning process to form a raw fiber;
subjecting the raw fiber to a stabilization process configured to oxygen cross-link the fiber to form a stabilized fiber; and
subjecting the stabilized fiber to a carbonization process.

* * * * *